United States Patent
Gulati et al.

(10) Patent No.: US 11,693,084 B2
(45) Date of Patent: Jul. 4, 2023

(54) RADAR TRANSMISSION TIME INTERVAL RANDOMIZED RADAR TRANSMISSIONS

(71) Applicant: QUALCOMM Incorporated, San Diego, CA (US)

(72) Inventors: Kapil Gulati, Hillsborough, NJ (US); Junyi Li, Chester, NJ (US); Sundar Subramanian, San Diego, CA (US); Michael John Hamilton, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 750 days.

(21) Appl. No.: 16/437,118

(22) Filed: Jun. 11, 2019

(65) Prior Publication Data

US 2020/0028656 A1 Jan. 23, 2020

Related U.S. Application Data

(60) Provisional application No. 62/700,458, filed on Jul. 19, 2018.

(51) Int. Cl.
*G01S 7/02* (2006.01)
*H04L 5/00* (2006.01)
*H04B 1/69* (2011.01)
*G01S 7/42* (2006.01)
*H04W 4/40* (2018.01)
*H04B 17/336* (2015.01)
*H04W 72/0446* (2023.01)
*G01S 7/282* (2006.01)

(52) U.S. Cl.
CPC ............ *G01S 7/023* (2013.01); *G01S 7/0232* (2021.05); *G01S 7/0235* (2021.05); *G01S 7/282* (2013.01); *G01S 7/42* (2013.01); *H04B 1/69* (2013.01); *H04B 17/336* (2015.01); *H04L 5/0082* (2013.01); *H04W 4/40* (2018.02); *H04W 72/0446* (2013.01); *H04B 2001/6912* (2013.01)

(58) Field of Classification Search
None
See application file for complete search history.

(56) References Cited

U.S. PATENT DOCUMENTS 6,087,928 A * 7/2000 Kleinberg ............. G01S 13/931
340/436
2002/0003488 A1 1/2002 Levin et al.
(Continued)

FOREIGN PATENT DOCUMENTS

WO WO-2015197226 A1 * 12/2015 ............. G01S 7/354
WO WO-2019200365 A1 * 10/2019 ............. G01S 13/02

OTHER PUBLICATIONS

Partial International Search Report—PCT/US2019/036684—ISA/EPO—dated Sep. 25, 2019.
(Continued)

*Primary Examiner* — Alex Skripnikov
(74) *Attorney, Agent, or Firm* — Patterson & Sheridan, LLP

(57) ABSTRACT

Certain aspects provide a method for radar detection by an apparatus. The method including transmitting a radar waveform in transmission time intervals (TTIs) to perform detection of a target object. The method further includes varying the radar waveform across TTIs based on one or more radar transmission parameters.

30 Claims, 11 Drawing Sheets

(56) References Cited

U.S. PATENT DOCUMENTS

| | | | |
|---|---|---|---|
| 2009/0135972 A1* | 5/2009 | Tanaka | H04B 17/336 375/346 |
| 2016/0036124 A1 | 2/2016 | Schoor | |
| 2017/0219689 A1 | 8/2017 | Hung et al. | |
| 2017/0363711 A1* | 12/2017 | Rao | H04B 15/02 |
| 2019/0094333 A1* | 3/2019 | Va | G01S 7/0232 |
| 2019/0195985 A1* | 6/2019 | Lin | G01S 13/931 |
| 2019/0364492 A1* | 11/2019 | Azizi | H04W 48/16 |
| 2019/0377075 A1* | 12/2019 | Tsfati | H04B 17/27 |
| 2020/0288431 A1* | 9/2020 | Lee | H04W 72/10 |

OTHER PUBLICATIONS

International Search Report and Written Opinion—PCT/US2019/036684—ISA/EPO—dated Jan. 15, 2020.

* cited by examiner

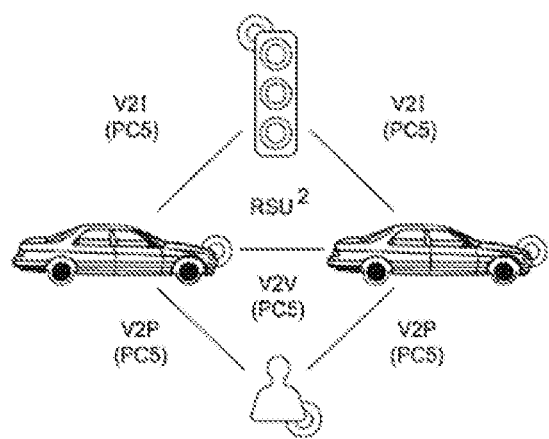
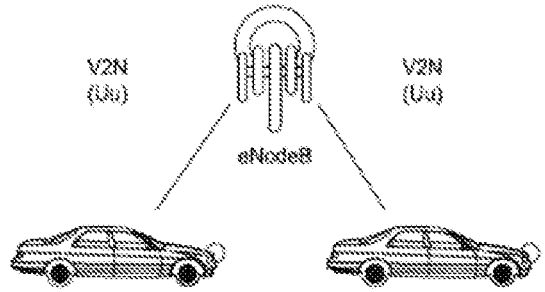
FIG. 3A
FIG. 3B

RADAR TRANSMISSION TIME INTERVAL RANDOMIZED RADAR TRANSMISSIONS

CROSS-REFERENCE TO RELATED APPLICATIONS

This application claims benefit of and priority to: U.S. Provisional Patent Application Ser. No. 62/700,458 filed Jul. 19, 2018, which is incorporated by reference herein in its entirety as if fully set forth below and for all applicable purposes.

INTRODUCTION

Field of the Disclosure

Aspects of the present disclosure relate to wireless communications, and more particularly, to techniques for performing transmission time interval (TTI) randomized radar transmissions.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

Vehicle to everything (V2X) communications seek to enable vehicles to communicate with one another to provide a host of services, including vehicle to vehicle communications (V2V), vehicle to infrastructure (V2I) communications, vehicle to grid (V2G) communications and vehicle to people (V2P) communications.

Radar detection systems complement V2X communications. Radar based detection systems use electromagnetic waveforms for several reasons including enhanced navigation and obstacle avoidance. In the evolution towards driverless vehicles, radar based detection systems play an ever increasing role. However, as more vehicles deploy radar based detection systems, interference become a larger problem. Accordingly, improvements to radar based detection systems are needed.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for radar detection by an apparatus. The method including transmitting a radar waveform in transmission time intervals (TTIs) to perform detection of a target object. The method further includes varying the radar waveform across TTIs based on one or more radar transmission parameters.

Certain aspects provide a means for radar detection by an apparatus. The apparatus includes a means for transmitting a radar waveform in transmission time intervals (TTIs) to perform detection of a target object. The apparatus further includes a means for varying the radar waveform across TTIs based on one or more radar transmission parameters.

Certain aspects provide a non-transitory computer readable storage medium that stores instructions that when executed by a processor of an apparatus cause the apparatus to perform a method of radar detection. The method includes transmitting a radar waveform in transmission time intervals (TTIs) to perform detection of a target object. The method further includes varying the radar waveform across TTIs based on one or more radar transmission parameters.

Certain aspects provide a radar detection apparatus including a memory and a processor. The processor is configured to cause the radar detection apparatus to transmit a radar waveform in transmission time intervals (TTIs) to perform detection of a target object. The processor is further configured to cause the radar detection apparatus to vary the radar waveform across TTIs based on one or more radar transmission parameters.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIGS. 3A and 3B illustrate certain V2X communications, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
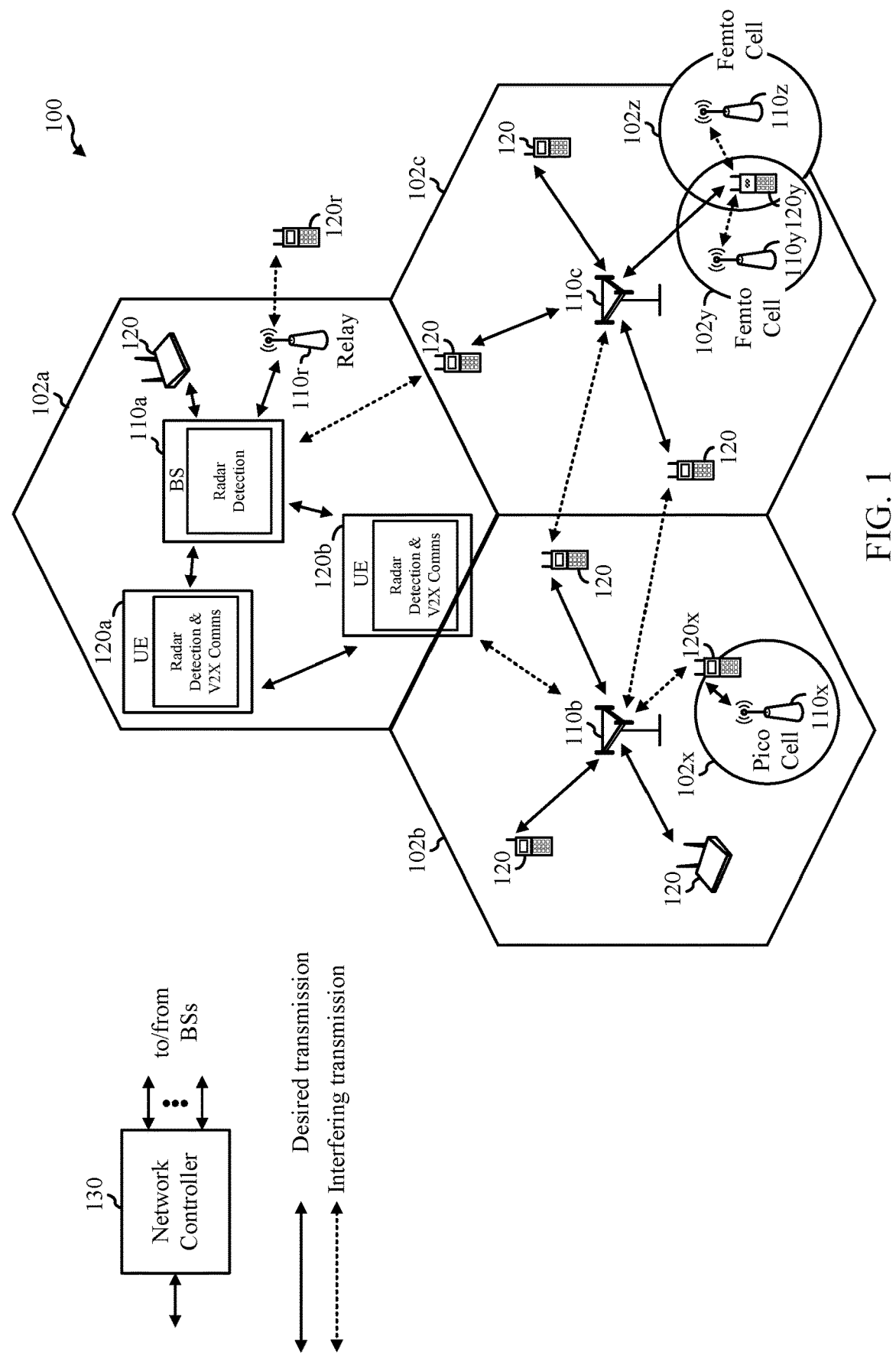
FIG. 1 is a block diagram conceptually illustrating an example telecommunications system, in accordance with certain aspects of the present disclosure.

Aspects of the present disclosure provide apparatus, methods, processing systems, and computer readable mediums for transmission time interval randomized radar transmissions.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. NR wireless communication systems may be used to communicate radar detection system information (e.g., codebooks (e.g., radar transmission parameter codebooks), sensor information (e.g., radar transmission parameters), etc.) to facilitate transmission time interval randomized radar transmissions. For example, as shown in FIG. 1, user equipment (UE) 120a and 120b include a radar detection module configured for object detection, and a V2X module configured for sidelink communication between two or more UEs (e.g., UE 120a and UE 120b), according to aspects described herein. Moreover, a base station (BS) 110a includes a radar detection module configured to support communication of radar transmission parameters to the UEs. In some configurations, the BS 110a may also support V2X communication between the one or more UEs (e.g., UE 120a and UE 120b).

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. ABS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
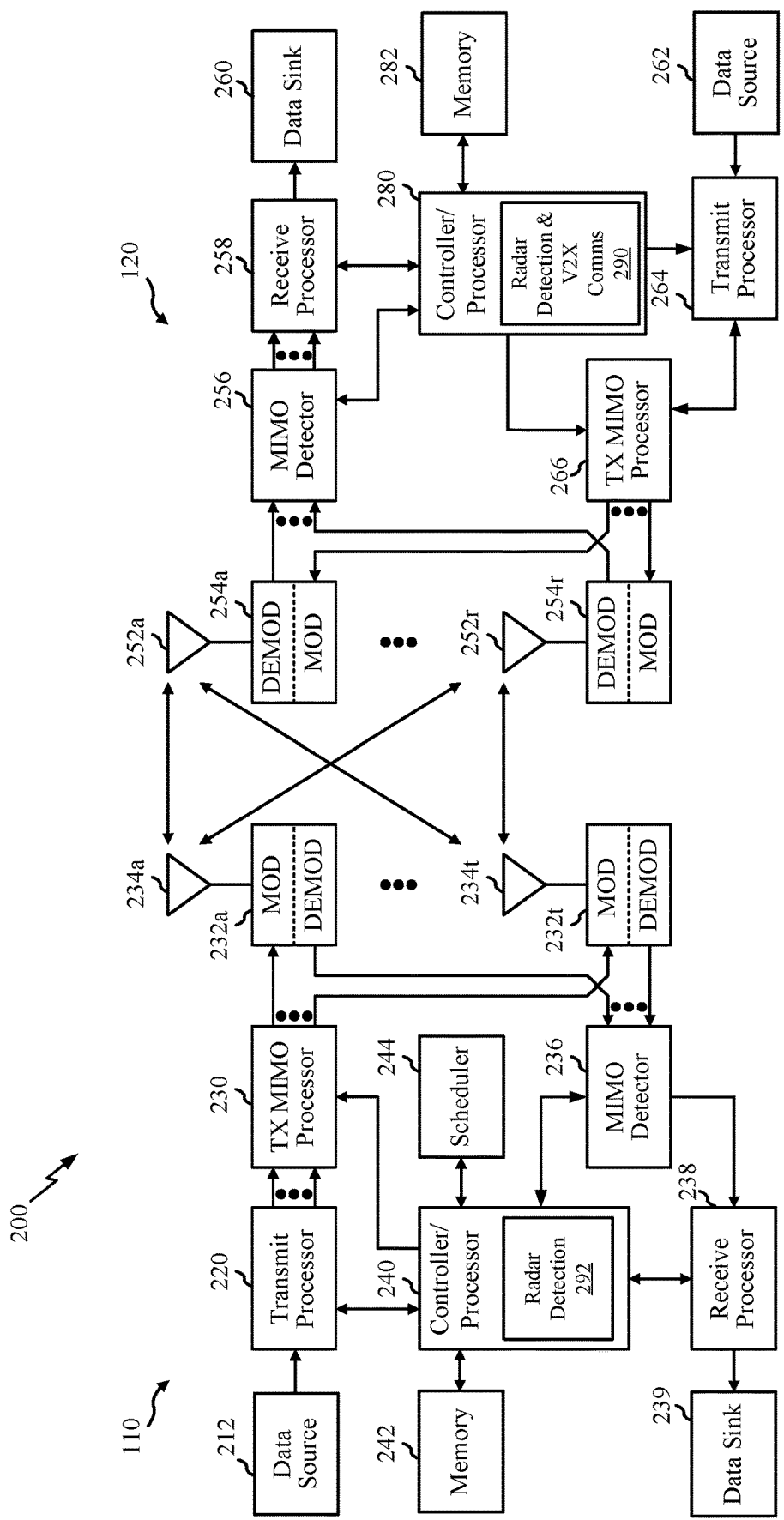
FIG. 2 is a block diagram conceptually illustrating a design of an example base station (BS) and user equipment (UE), in accordance with certain aspects of the present disclosure.

FIG. 2 illustrates example components of BS 110 and UE 120 (as depicted in FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein.

At the BS 110, a transmit processor 220 may receive data from a data source 412 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The processor 220 may also generate reference symbols, e.g., for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the base station 110 and may provide received signals to the demodulators (DEMODs) in transceivers 254a through 254r, respectively. Each demodulator 254 may condition (e.g., filter, amplify, down-convert, and digitize) a respective received signal to obtain input samples. Each demodulator may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a through 254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the base station 110 and the UE 120, respectively. In some configurations, the controller/processor 240 of the BS 110 includes a radar detection module 292 configured to support communication of radar transmission parameters to one or more UEs. In some configurations, the controller/processor 280 of the UE 120 includes a radar detection and V2X 290 circuit configured for object detection and sidelink communication between two or more UEs (e.g., UE 120a and UE 120b), according to aspects described herein. The processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

Example Transmission Time Interval Randomized Radar Transmissions

Radio detection and ranging (radar) is a complementary technology to vehicle-to-everything (V2X) communication that enhances road safety and the driving experience. Radar uses electromagnetic waveforms to detect objects and determine information such as its relative speed and location. Vehicles can use radar to enhance several technologies. For example radar can enable advanced navigation techniques such as accident avoidance and self-driving operations, etc. In accordance with certain aspects of the disclosures, radar detection systems can interface with, or be incorporated into, V2X communication systems.

V2X communications include, among others, vehicle-to-vehicle (V2V) communications. In some circumstances, two or more vehicles (e.g., UEs) may communicate with each other using sidelink signals. Real-world applications of such sidelink communications may include public safety, proximity services, UE-to-network relaying, Internet of Everything (IoE) communications, IoT communications, mission-critical mesh, and/or various other suitable applications. Generally, a sidelink signal relates to a signal communicated from one entity (e.g., vehicle or UE) to another entity (e.g., a second vehicle or UE) without relaying that communication through a scheduling entity (e.g., gNB), even though the scheduling entity may be utilized for scheduling and/or control purposes. In some examples, the sidelink signals may be communicated using a licensed spectrum (unlike wireless local area networks, which typically use an unlicensed spectrum).

FIGS. 3A and 3B depict a V2X system in two complementary transmission modes. FIG. 3A shows a first transmission mode using direct communications between participants in the local area. FIG. 3B shows a second transmission mode using network communications through a network, such as an eNodeB.

As illustrated in FIG. 3A, the first transmission mode allows for direct communication between different participants in a given geographic location. For example, a vehicle can communicate with an individual (V2P) (e.g., through a PC5 interface). A vehicle can also communicate and another vehicle (V2V) (e.g., through a PC5 interface). Highway components, such as a traffic signal or other infrastructure may also be connected to vehicles in (V2I) communication. In each embodiment, each element may be a transmitter and a receiver and capable of two-way communication. In the configuration provided, the first transmission mode is a self-managed system and network assistance is not needed to facilitate the exchange of data. Such transmission modes provide for reduced cost and increased reliability as network service interruptions do not occur during handover operations for moving vehicles. Certain resource assignments for communication may also not need coordination between operators. Additionally, subscription to a network is not necessary.

In certain aspects, a V2X system is configured to work in a 5.9 GHz spectrum, thus any vehicle with an equipped system may access this common frequency and share information (e.g., codebooks (e.g., radar transmission parameter codebooks), sensor information (e.g., radar transmission parameters), etc.). V2X operations may also use other frequencies for communication (e.g., using 802.11p based communication). In one aspect, the V2X system may be operated in a 10 MHz band that describes/contains basic safety services. In other aspects, the V2X system may be operated over a wider frequency band.

In FIG. 3B, a second of two complementary transmission modes is illustrated. In certain aspects, a vehicle may communicate to another vehicle through network communications. These network communications may occur through discrete nodes, such as an eNodeB, that send and receive information between vehicles and a network. The network communications may be used, for example, for long range communications between vehicles, such as noting the presence of accident miles ahead. Other types of communications may be sent by the node to vehicles, such as traffic flow conditions, road hazard warnings, environmental/weather reports, service station availability, radar detection system information (e.g., codebooks, sensor information, etc.), to name a few. Data may also be obtained from cloud-based sharing services. Residential service units (RSUs) may be utilized as well as 4G/5G small cell communication technologies to benefit in more highly covered areas to allow real time information to be shared among V2X users. As the number of RSUs diminishes, the V2X systems may rely more on small cell communications or other technology.

Radar can provide data over a wide range of conditions to improve the driving experience. Radar is able to operate in the day or night and over several miles. Radar can be used to identify multiple objects (e.g., cars, pedestrians, buildings, etc.) at substantially the same time, even in adverse weather conditions. Radar systems transmit electromagnetic waves and receive their reflection off objects. By measuring the time delay between the transmitted and the received waveform, it is possible to determine the distance (or range) that an object is from the transmitter.

For a stationary ranging radar system, distance (D)=½ the time delay between the transmitted and received radar waveform times the speed of the radar waveform (which may be approximated as $3 \times 10^8$ or (C)). Transmitters and receivers can use the same antenna, or groups of antennas, and use circuitry such as a duplexer to control input and output operation. In certain aspects, it is impractical to use single pulse radar systems, as it will be appreciated that for a ten meter target, the time delay is less than 1/10 of a microsecond [$(2*10)/(3*10^8)$=66 nanoseconds]. Thus, another approach to radar detection is to use a continuous wave (CW) radar waveform.

Unmodulated CW (UM-CW) radar detection systems transmit a radar waveform at a constant frequency and use any change in frequency in the received radar waveform to determine the speed of an object. UM-CW radar is not typically used to provide range as stationary objects do not generate a frequency change in the received radar waveform. UM-CW radar is commonly used in sports, for example to determine the speed of a baseball or a racecar.

Figure 4A:
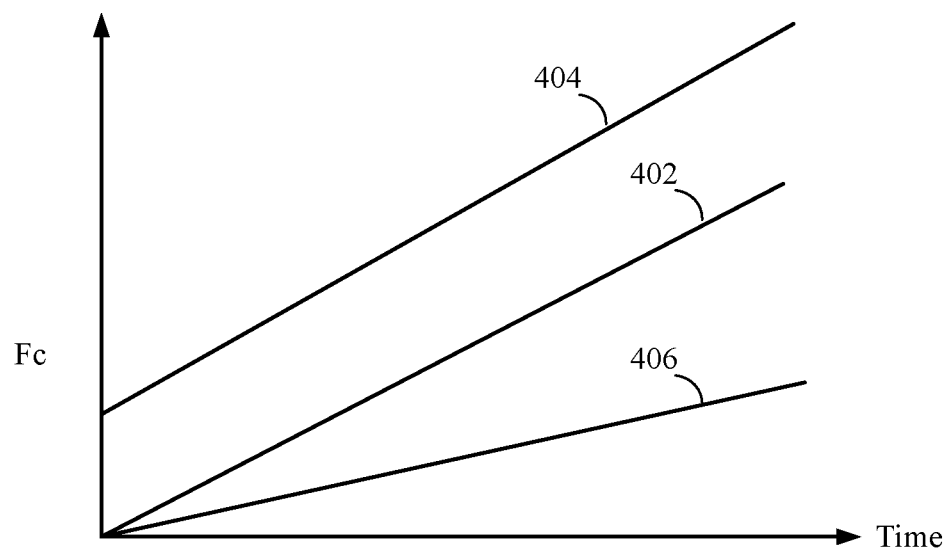
FIGS. 4A and 4B illustrate transmitted FM-CM radar waveforms, in accordance with certain aspects of the present disclosure.

To obtain more information, frequency modulated CW (FM-CW) radar may be used. FIG. 4A depicts three FM-CW radar waveforms (or chirps) on a frequency-time scale. Chirp 402 has a first slope with its frequency originating at (Fc) of zero (or zero offset). Chirp 404 has the same slope as chirp 402 and a positive (Fc) offset. Chirp 406 has a zero offset and a second slope that is lower than the first slope of chirp 402 (lower frequency delta for the same time delta).

Figure 4B:
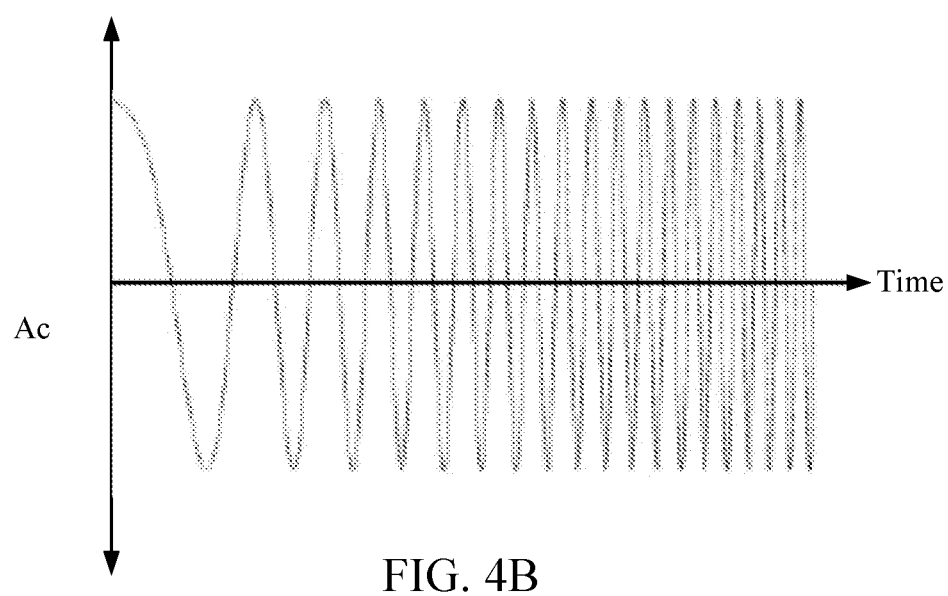

FIG. 4B depicts chirp 402 from FIG. 4A on an amplitude-time scale wherein the amplitude (Ac) oscillations increase in frequency over the chirp time. It will be appreciated that in certain aspects, the phase of the chirp may be controlled to provide a desired phase. When an FM-CW chirp is received, it may experience both a change in frequency and a time delay, and therefore can be used to simultaneously measure the relative range (e.g., using the time delay) and the velocity (e.g., using the frequency change) of an object from the radar detection system.

Figure 5:
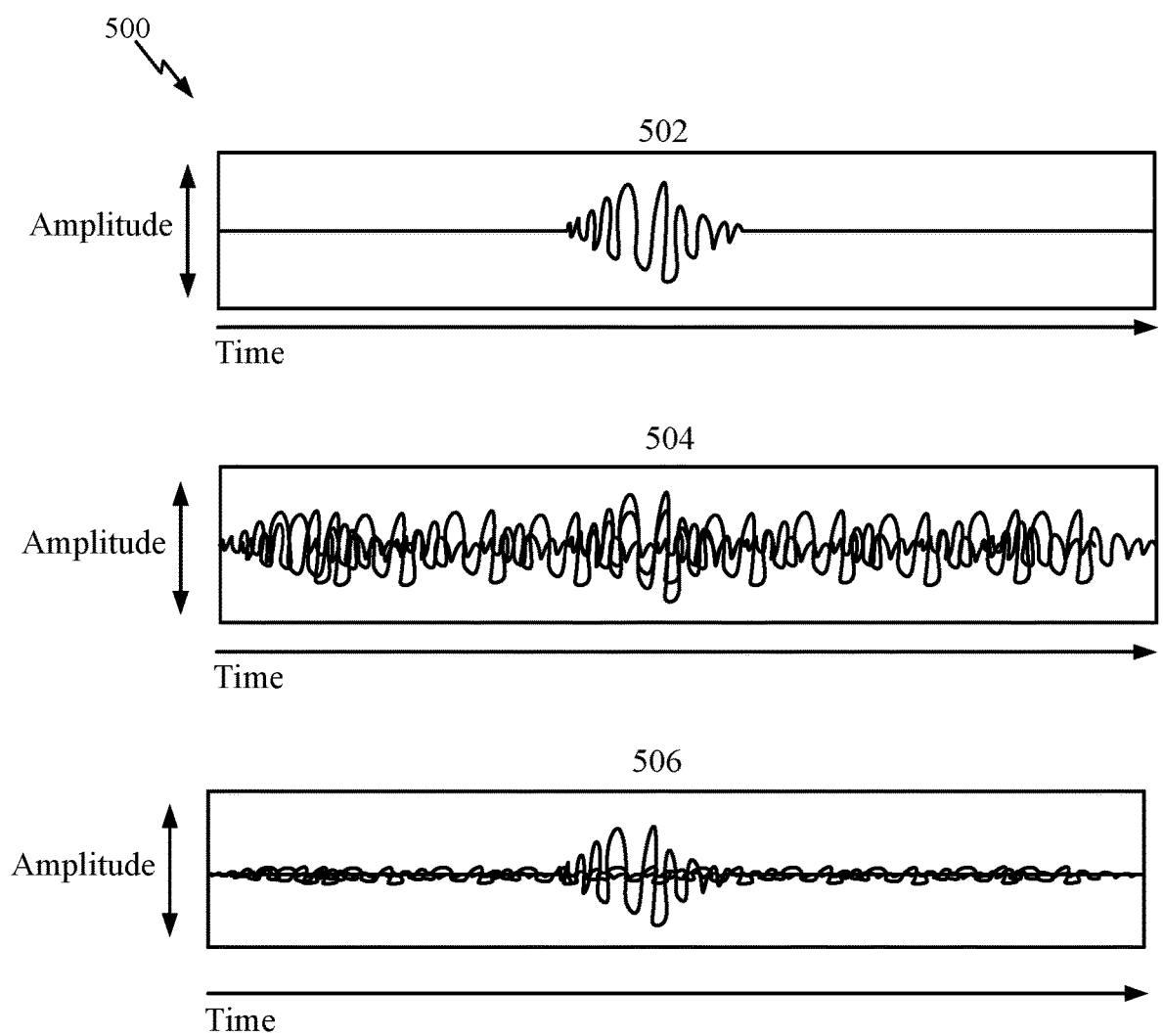
FIG. 5 illustrates received FM-CM radar waveforms, in accordance with certain aspects of the present disclosure.

FIG. 5 shows three graphs 500 representative of an object detected by one or more radar waveforms as described below. Radar waveform 502 depicts detecting an object with a single chirp in an environment free from interference. The signal to noise ratio is ideal as the noise is shown as zero. It will be appreciated that environments are rarely free from interference. Radar waveform 504 depicts detecting an object with a single chip in an environment with interference. It will be appreciated that the signal to noise ratio is poor because the interference is high making object detection poor. Radar waveform 506 depicts the same high interference environment as with radar waveform 504; however, radar waveform 506 is representative of coherent integration (or time-domain averaging) using a number of chirps (e.g., 64 chirps). It will be appreciated that interference is often random, and thus using a plurality of chirps does not increase the signal of the interference because they do not coherently combine. However, it will be appreciated that a received radar signal incident an object will coherently combine, thereby increasing the signal to noise ratio as shown at radar waveform 506. As shown in FIG. 5, the signal to noise ratio of signal 506 is better than signal 504.

Figure 6:
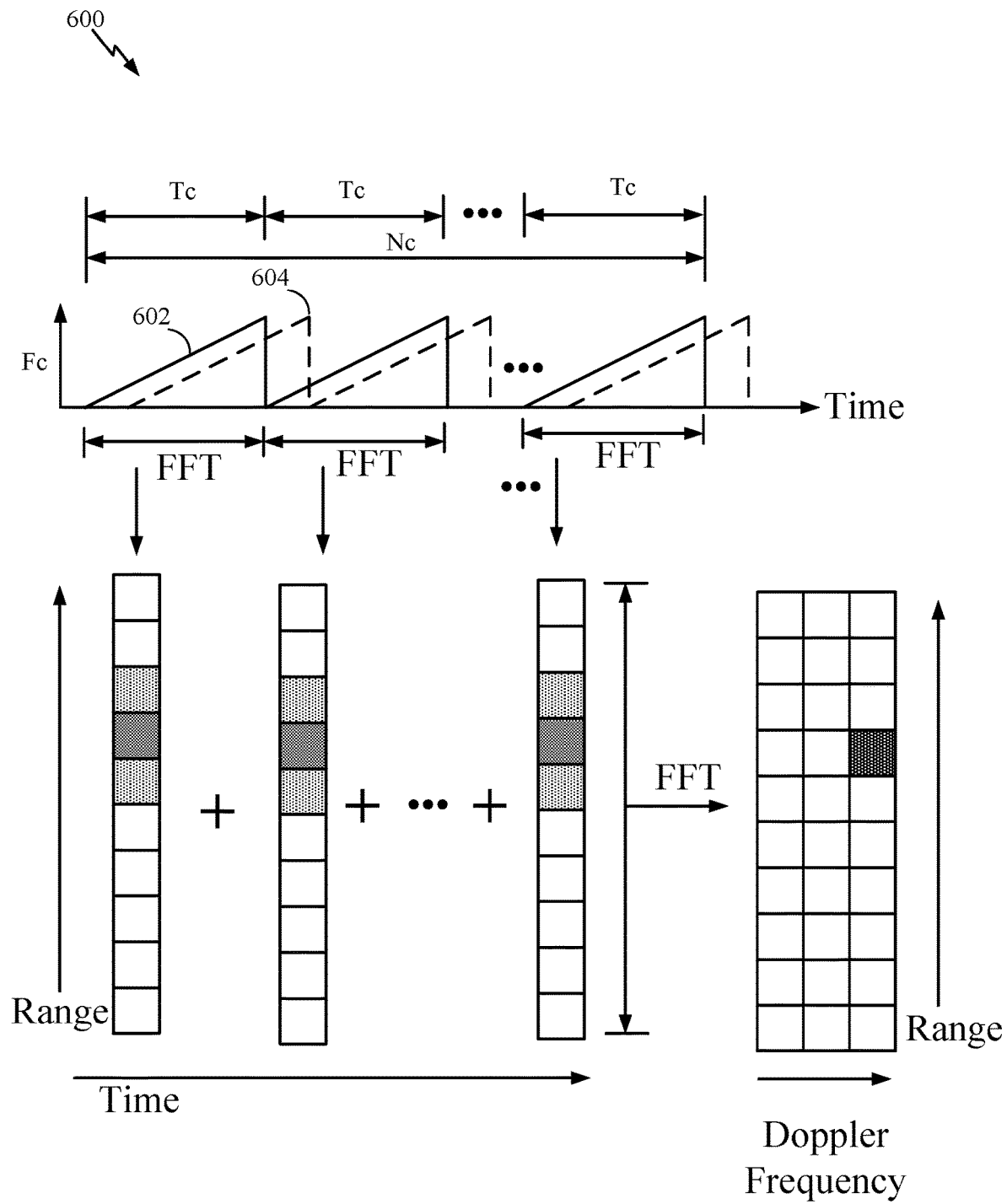
FIG. 6 illustrates data extrapolation from a transmitted and received FM-CM radar waveform.

FIG. 6 depicts certain aspects of a radar detection system 600 using an FM-CW radar waveform to provide both range and speed using coherent integration. FIG. 6 includes a transmitted FM-CW radar waveform 602, which is a saw-tooth radar waveform with a linear increase in frequency for each chirp, for each chirp time (Tc). In certain aspects, each Tc is about 25 microseconds. Time period Nc represents a time period for a transmission of a plurality of chirps (e.g., 64 chirps), and is also referred to as a frame. It will be appreciated that other FM-CW waveforms, chirp times (Tc), and frame times (Nc) are within the scope of the disclosure.

FIG. 6 further includes a received radar waveform 604. Received radar waveform 604 is shown as shifted to the right of transmitted radar waveform 602 by a time delay. As shown in FIG. 6, though signal processing (e.g., taking the fast Fourier transform (FFT)), it will be appreciated that a range distribution may be determined. It will be further appreciated, that by taking the FFT of the range distributions, a frequency shift (Doppler frequency) may be determined. It will be appreciated that a constant false alarm rate (CFAR) algorithm may be used for further signal processing to aid in detecting an object against interference. The Doppler frequency may be used to determine a relative speed, including zero, that an object is moving. For example, the time delay may indicate that the target is 50 meters away, and the Doppler frequency may indicate that the target is moving at about 1 meter per second away from the radar detection system.

Figure 7:
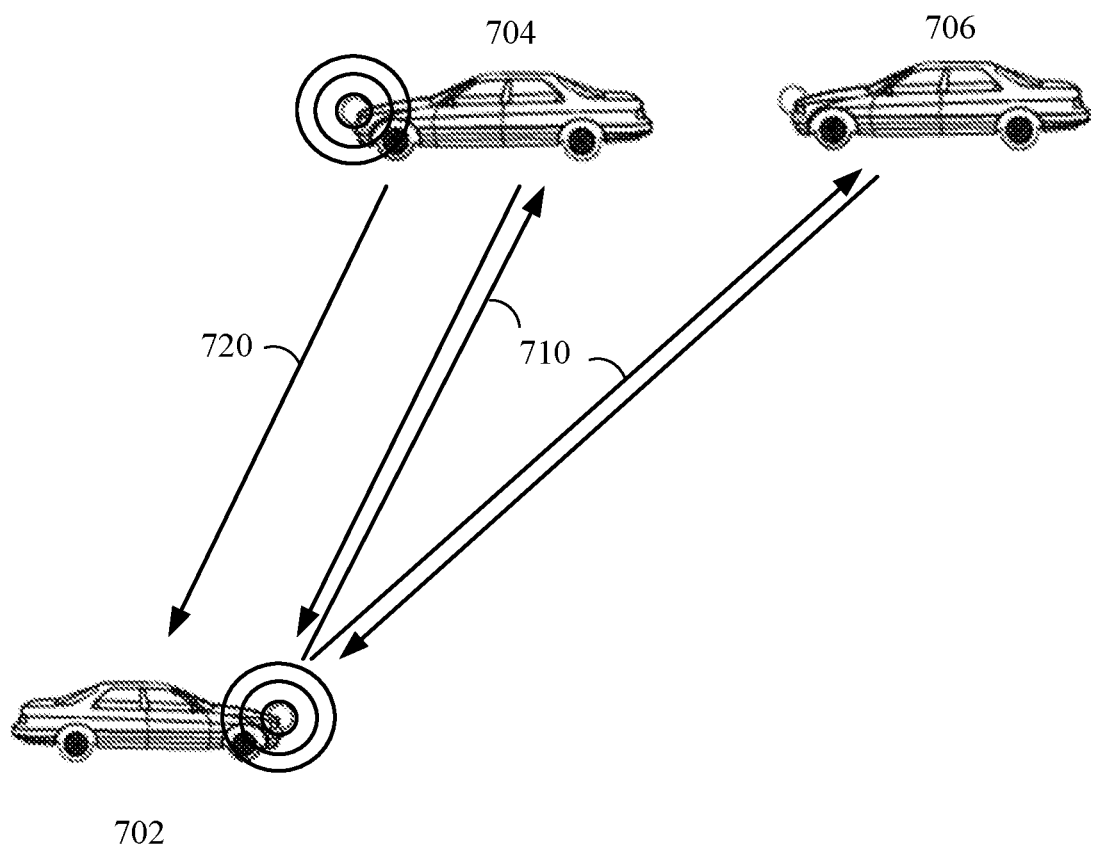
FIG. 7 illustrates radar detection, in accordance with certain aspects of the present disclosure.

As more radar detection systems are deployed, interference is a greater problem. For example, as shown in FIG. 7, vehicle 702 is using a radar detection system (e.g., a radar detection system apparatus connected to vehicle 702) and coherent integration to detect objects 704 and 706 using radar waveform 710. When vehicle 704 and 706 are not using radar detection, the reflections from radar waveform 710 coherently combine and the data is used to successfully identify vehicles 704 and 706.

In other aspects, vehicle 704 is also using a radar detection system (e.g., a radar detection system apparatus integrated into vehicle 704) and transmits a radar waveform 720. In FIG. 7, radar waveform 720 is a substantially similar waveform (e.g., slope, offset, and phase) to radar waveform 710. The radar detection system of vehicle 702 may receive radar waveform 720 and determine that radar waveform 720 is a reflected signal of radar waveform 710. In this case, the radar detection system of vehicle 702 determines that there is an object at half the distance to vehicle 704. It will be appreciated that this object is identified in error (or a ghost target). It will be further appreciated that the signal strength of radar waveform 720 as measured at the radar detection system of vehicle 702 is likely to be much stronger than the reflected signal of radar waveform 710 as the strength of a radar signal is inversely proportional to the square of the distance from the source. In certain aspects, because radar waveform 720 is much stronger than the reflected signal of radar waveform 710, vehicle 702 is unable to detect vehicle 706 over the high signal strength of radar waveform 720. Thus there exists a need to eliminate ghost target errors as well as improve the signal to noise ratio in high interference environments.

Figure 8:
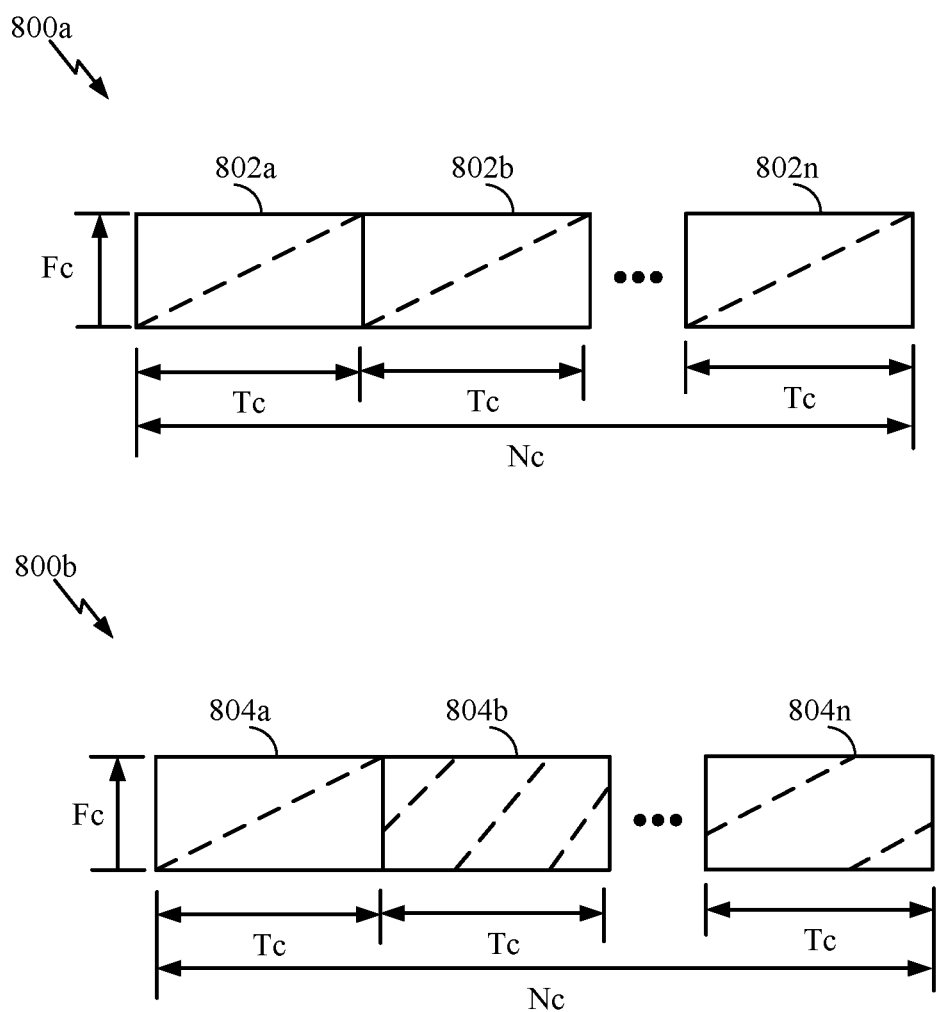
FIG. 8 illustrates radar waveforms, in accordance with certain aspects of the present disclosure.

FIG. 8 shows a series of graphs representative of a radar waveform 800a and a radar waveform 800b on a frequency-time scale. Radar waveform 800a includes a plurality of chirps 802a to 802n, with each chirp 802 having a chirp time (Tc) and the plurality of chirps collectively having a frame time (Nc). In certain aspects Tc may be 25 microseconds, and Nc may be frame of 64 chirps, but Tc and Nc may be shorter or longer without deviating from the scope of the disclosure (e.g., a chirp Tc of 10 microseconds, and a frame Nc of 1024 chirps). Each chirp 802 has the same slope, offset, and phase.

Radar waveform 800b includes a plurality of chirps 804a to 804n, each with a different set of radar transmission parameters. Radar transmission parameters can include at least one of a waveform parameter, an antenna parameter, or a modulation parameter.

A waveform parameter includes at least one of a slope, an offset, or a phase. For example, chirp 804a in FIG. 8 shows a first slope and no offset. Chirp 804b shows a positive offset and a slope greater than the slope in chirp 804a. Chirp 804n has the same slope as chirp 804a, but a positive offset. The phase of the radar waveform may also be selected as a waveform parameter independently or in connection with any one of chirps 804a to 804n.

An antenna parameter includes at least one of a beam form, a polarization, or an antenna selection. A beam form includes using at least one antenna to direct the propagation path of the radar waveform transmitted and received by a radar detection system. It will be appreciated that in certain aspects, selecting a narrower beam form may reduce interference. For example, if two vehicles are traveling next to each other down a highway, each vehicle may select a narrow forward-facing radar beam form antenna parameter to reduce potential interference from the radar detection system of the nearby vehicle. In other cases, a vehicle may select a wide radar beam form antenna parameter, for example to aid in self-driving operation.

A polarization antenna parameter may also be selected for similar reasons. For example, if a radar detection system of a first vehicle is using a first polarization antenna parameter in a certain area, then a second vehicle may select a second polarization antenna parameter to reduce interference when in the same area.

An antenna selection antenna parameter includes selecting one or more antennas to use for radar detection (e.g., to support beamforming, or for spatial response). It will be appreciated that a radar detection system may have a plurality of antennas, each of which may not have the same spatial response to a radar waveform. Thus, in certain aspects, a radar detection system may select an antenna selection parameter associated with a certain antenna that has a lower interference than another antenna.

A modulation parameter includes at least one of a time division multiplexing (TDM) parameter, or a frequency division multiplexing (FDM) parameter. TDM may be used to define certain on-off patterns for a radar waveform. FDM may be used to define certain frequency subbands for a radar waveform.

However, as more radar detection systems are deployed, the likelihood of overlapping radar waveforms increases. This is in part because a waveform parameter such as the slope of a chirp may be limited to a certain number of slopes (e.g., because of a hardware limitation). Thus in accordance with certain aspects, transmission time interval (TTI) randomized radar detection is performed.

Figure 9:
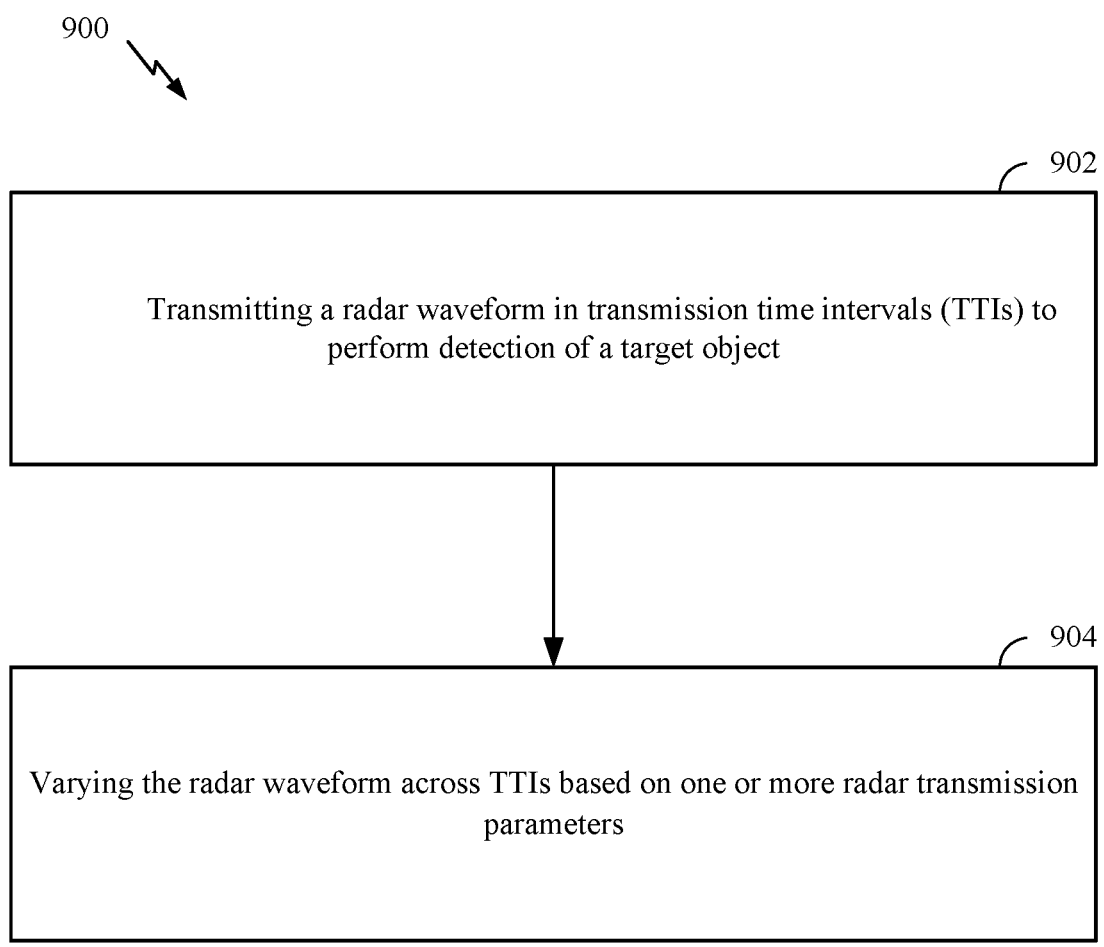
FIG. 9 illustrates a block diagram of a method of radar detection, in accordance with certain aspects of the present disclosure.

FIG. 9 provides a method 900 for radar detection in accordance with certain aspects of the disclosure. In certain aspects, method 900 is performed by an apparatus in accordance with certain aspects of the disclosure. The apparatus may be a stand-alone radar detection system connected to a device (e.g., a vehicle, robot, computing device, etc.) though a wireless connection (e.g., Bluetooth, WiFi, etc.) or physically integrated into the device (e.g., integrated into vehicle electronics during or after manufacturing). In other aspects, the apparatus may be connected, or integrated, into a second device (e.g., a second vehicle) and accessible to the first device (e.g., using V2X communications). For example, the first device may obtain useful radar information from the second device using V2X communications. Thus, it will be appreciated that the first device and the second device may communicate information relating to their respective radar detection systems between each other. It will also be appreciated that the apparatus may use its own processor to execute instructions stored on a memory (e.g., local storage, cloud storage, etc.) or it may use a shared processor (e.g., a processor shared with one or more other sensors or device components) to execute instructions. In other aspects the apparatus includes more than one radar detection system working together to perform the operations described in the disclosure.

At block 902, the radar detection system transmits a radar waveform in transmission time intervals (TTIs) (e.g., a chirp, a set of chirps, a frame, a slot, etc.) to perform detection of a target object. At block 904, the radar detection system varies the radar waveform across multiple TTIs based on one or more radar transmission parameters.

Figure 10:
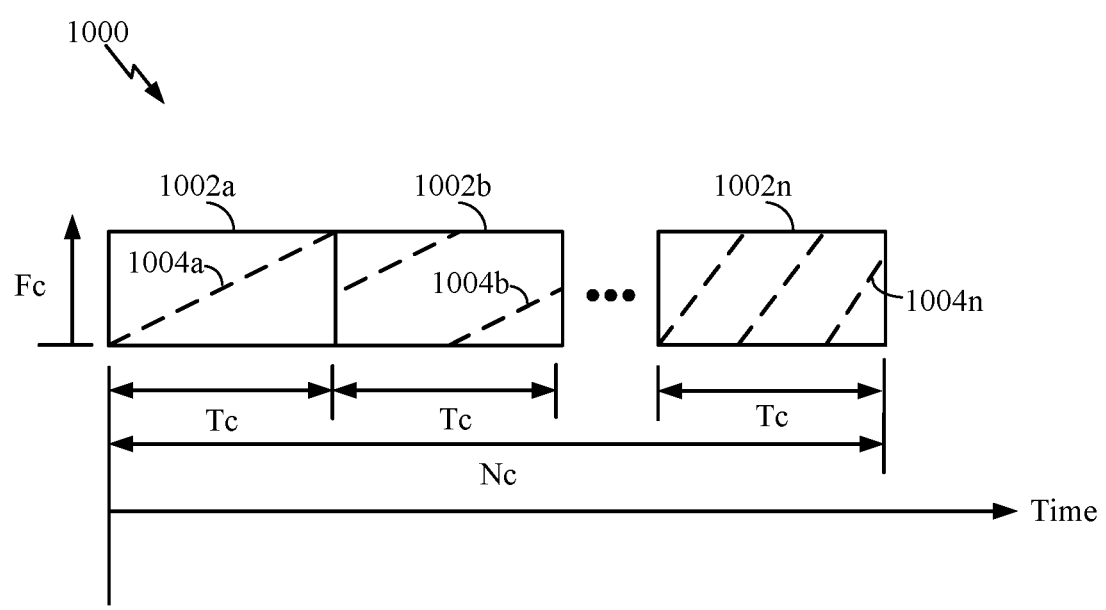
FIG. 10 illustrates transmission time interval randomized radar waveforms, in accordance with certain aspects of the present disclosure.

FIG. 10 shows radar waveform 1000 that includes transmission time interval (TTI) 1002a to 1002n, with each TTI 1002 having a transmission time (Tc) and the plurality of TTIs collectively having a TTI frame time (Nc). Each radar waveform within a Tc may be referred to as a chirp 1004, and the radar waveform within Nc may be referred to as a frame including chirps 1004s (e.g., 64 chirps, 128 chirps, 256, chirps, 1024 chirps, etc.).

FIG. 10 further shows that each chirp 1004 of radar waveform 1000 is transmitted using different radar transmission parameters. For example, chirp 1004a is a chirp configured with a zero offset and a first slope. Chirp 1004b is a chirp configured with a positive offset and uses the same slope as the first slope. Chirp 1004n is a chirp configured with a zero offset and a second slope that is higher than the first slope of chirps 1004a and 1004b.

Each TTI is based on one or more radar transmission parameters (e.g., a waveform parameter, an antenna parameter, or a modulation parameter). In certain aspects, radar waveform 1000 is varied substantially randomly every TTI. It will be appreciated that in certain aspects, two or more TTIs in a substantially randomized radar waveform may have the same radar transmission parameters (e.g., two or more consecutive TTIs) without deviating from the scope of this disclosure.

In certain aspects, radar waveform 1000 is varied substantially randomly every TTI using the one or more radar transmission parameters selected to orthogonalize, suppress, or shape interference. In other aspects the one or more radar transmission parameters are selected based on radar transmission parameters that are designed to ensure mutually low interference (e.g., a codebook of radar transmission parameters).

It will be appreciated that a radar detection system itself (or using V2X) can identify which radar transmission parameters exhibit lower interference than other radar transmission parameters. In certain aspects, when radar waveform 1000 is varied substantially randomly every TTI, and certain TTIs are associated with low interference, the radar detection system may select one or more radar transmission parameters associated with low interference for a future TTI. For example, a vehicle may be connected to a radar detection system that transmits a radar waveform in TTIs and varies substantially randomly the radar waveform across TTI based on one or more radar transmission parameters. In this case the vehicle uses a codebook obtained through V2X communications to vary substantially randomly the radar transmission parameters. In certain aspects, as the radar detection system transmits the radar waveform, the radar detection system may determine that certain radar transmission parameters are preferable based on the current conditions (e.g., low interference, greater target identification, radar transmission mode (e.g., self-driving), etc.).

In certain aspects, when offset is varied between TTIs, it can lead to a shift in the range domain as offset shifts the frequency of a radar waveform (e.g., a chirp). In other aspects when slope is varied between TTIs, it can lead to a wider energy (or increased noise) because the time domain may be compressed or extended.

It will be appreciated that in certain aspects, when each TTI is based on one or more radar transmission parameters for an FM-CW radar waveform, additional signal processing (e.g., equalization and resampling) is used for each TTI received by the radar detection system to coherently integrate the plurality of TTIs. It will be appreciated that additional signal processing may increase processing requirements of the radar detection system.

In certain aspects, equalization may be used, and each TTI is coherently combined by a first Fourier transform (e.g., a fast scale Fourier transform (FFT)) and then a second Fourier transform (e.g., a slow scale discrete Fourier transform (DFT)) to determine range before Doppler processing is done to determine relative speed. It will be appreciated that in certain aspects, small in-accuracies may be introduced due to varying parameters every TTI (e.g., due to in-exact equalization and resampling that may ignore Doppler variations within a single TTI). Thus it will be appreciated that in certain aspects, slope is varied over TTIs for interference suppression, and offset of varied over TTIs for interference shaping. It will be appreciated that any combination of the one or more radar transmission parameters may be used within the scope of this disclosure, and each radar transmission parameters, or combination thereof, may have its own additional signal processing requirements to extrapolate the information from the received radar waveform that was varied substantially randomly from the radar detection unit.

In certain aspects, each TTI in FIG. 10 is based on one or more radar transmission parameters selected from a codebook. For example, a codebook of radar transmission parameters may include parameters indicative of a constant amplitude zero autocorrelation waveform (or CAZAC) such as a Zandoff-Chu (ZC) sequence. In certain aspects, a ZC sequence includes one or more radar transmission parameters that may be selected by a first radar detection system to minimize interference with a second radar waveform transmitted by a second radar detection system (not shown). It will be appreciated that in certain aspects, the second radar detection system may also vary radar transmission parameters for each TTI (e.g., randomly or using a codebook (e.g., using a ZC based sequence). In other aspects the second radar detection system may use fixed radar transmission parameters, and the first radar detection system may vary the radar transmission parameters randomly until certain parameters are selected by the radar detection system that reduce interference with the second radar detection system (e.g., below a threshold (e.g., a threshold based on signal to interference ratio (SIR)). In other aspects, if the first radar detection system detects a change in interference, it may resume varying one or more radar transmission parameters for each TTI. It will be appreciated that a radar detection system selecting one or more radar transmission parameters from a codebook may also select one or more radar transmission parameters randomly, and in some cases within the same frame.

Figure 11:
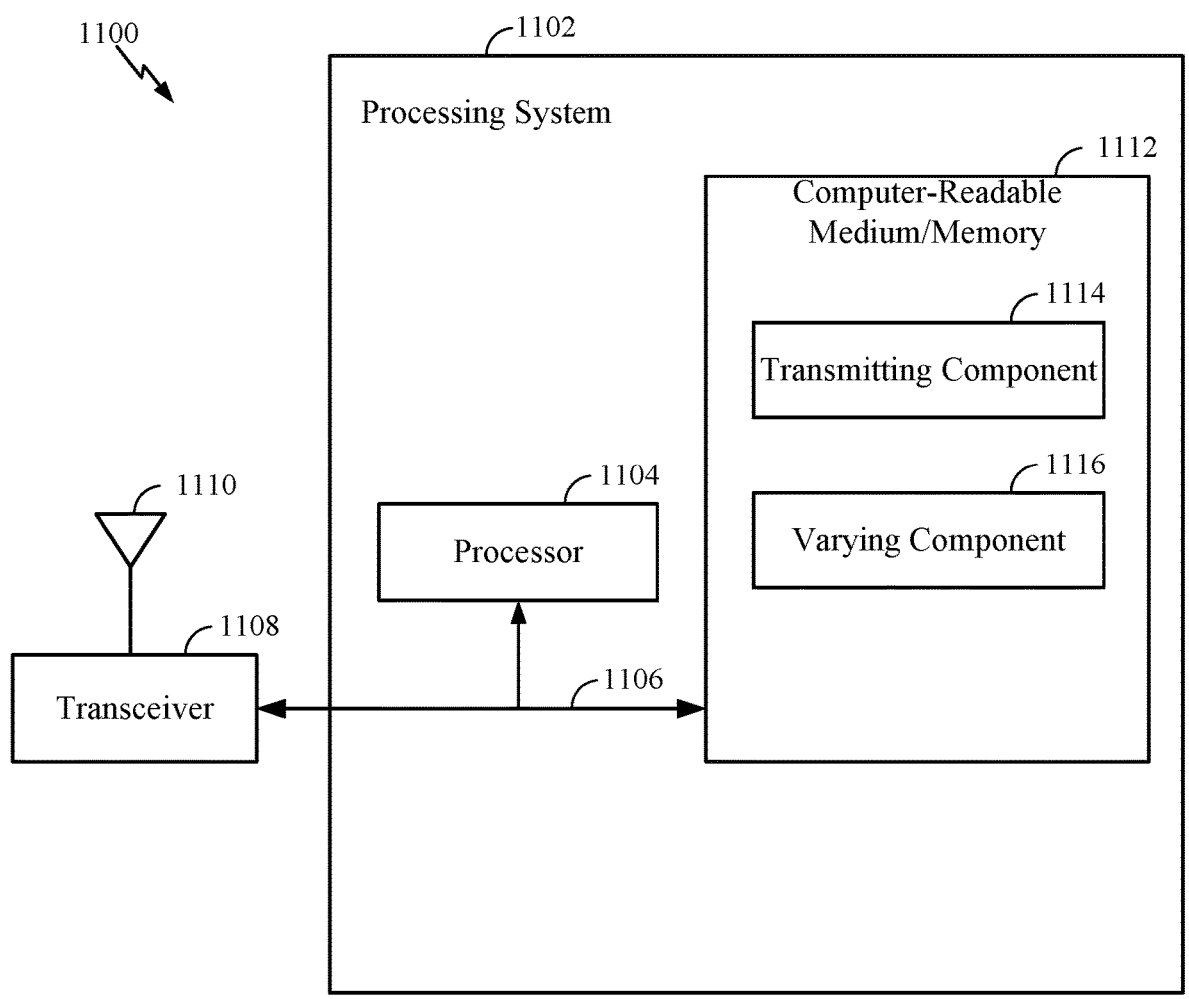
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 9. The communications device 1100 includes a processing system 1102 coupled to a transceiver 1108. The transceiver 1108 is configured to transmit and receive signals for the communications device 1100 via an antenna 1110, such as the various signal described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions that when executed by processor 1104, cause the processor 1104 to perform the operations illustrated in FIG. 9, or other operations for performing the various techniques discussed herein.

In certain aspects, the processing system 1102 further includes a selecting component 1114 for performing the operations illustrated in block 902 of FIG. 9. Additionally, the processing system 1102 includes a performing component 1116 for performing the operations illustrated in block 904 of FIG. 9. The selecting component 1114 and the performing component 1116 may be coupled to the processor 1104 via bus 1106. In certain aspects, the selecting component 1114 and the performing component 1116 may be hardware circuits. In certain aspects, the selecting component 1114 and the performing component 1116 may be software components that are executed and run on processor 1104.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g.,

RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for radar detection by an apparatus, comprising:
transmitting a radar waveform in transmission time intervals (TTIs) to perform detection of a target object;
selecting a subset of a plurality of radar transmission parameters based on a current condition of the apparatus by:
selecting, as the subset, a first subset of the plurality of radar transmission parameters based on at least one of: a first threshold of interference or a first driving mode of the apparatus; and
selecting, as the subset, a second subset of the plurality of radar transmission parameters based on at least one of: a second threshold of interference or a second driving mode of the apparatus, wherein the first subset is different than the second subset; and
varying the radar waveform across multiple TTIs based on the selected subset of the plurality of radar transmission parameters, wherein the varying the radar waveform comprises varying values of at least one of the selected first subset of the plurality of radar transmission parameters or the selected second subset of the plurality of radar transmission parameters.

2. The method of claim 1, wherein the plurality of radar transmission parameters comprise at least one of: a waveform parameter, an antenna parameter, or a modulation parameter.

3. The method of claim 2, wherein the waveform parameter comprises at least one of: a slope, an offset, or a phase.

4. The method of claim 2, wherein the antenna parameter comprises at least one of: a beam form, a polarization, or an antenna selection.

5. The method of claim 2, wherein the modulation parameter comprises at least one of: a time division multiplexing (TDM) parameter, or a frequency division multiplexing (FDM) parameter.

6. The method of claim 1, wherein one or more of the plurality of radar transmission parameters are varied substantially randomly.

7. The method of claim 1, wherein one or more of the plurality of radar transmission parameters are varied based in part on a codebook.

8. The method of claim 1, further comprising receiving a sidelink communication comprising codebook radar parameters configured to vary one or more of the plurality of radar transmission parameters.

9. The method of claim 1, further comprising receiving a network communication comprising radar detection system information configured to vary one or more of the plurality of radar transmission parameters.

10. The method of claim 1, wherein one or more of the plurality of radar transmission parameters are varied based in part on a threshold of interference associated with the one or more of the plurality of radar transmission parameters.

11. The method of claim 10, wherein the threshold of interference is based in part on a signal to interference ratio (SIR).

12. The method of claim 10, wherein the inference is based at least in part on one or more radar waveforms from one or more radar sources.

13. The method of claim 1, wherein the TTIs comprise at least one of: a chirp, a set of chirps, a frame, or a slot.

14. The method of claim 1, wherein varying the radar waveform across TTIs based on one or more of the plurality of radar transmission parameters is based at least in part on one or more vehicle-to-everything (V2X) communications.

15. A radar detection apparatus comprising:
a memory; and
a processor communicatively coupled to the memory, wherein the processor is configured to:
transmit a radar waveform in transmission time intervals (TTIs) to perform detection of a target object;
select a subset of a plurality of radar transmission parameters based on a current condition of the radar detection apparatus by:
selecting, as the subset, a first subset of the plurality of radar transmission parameters based on at least one of: a first threshold of interference or a first driving mode of the radar detection apparatus; and
selecting, as the subset, a second subset of the plurality of radar transmission parameters based on at least one of: a second threshold of interference or a second driving mode of the radar detection apparatus, wherein the first subset is different than the second subset; and
vary the radar waveform across TTIs based on the selected subset of the plurality of radar transmission parameters comprising varying values of at least one of the selected first subset of the plurality of radar transmission parameters or the selected second subset of the plurality of radar transmission parameters.

16. The radar detection apparatus of claim 15, wherein the plurality of radar transmission parameters comprise at least one of: a waveform parameter, an antenna parameter, or a modulation parameter.

17. The radar detection apparatus of claim 16, wherein the waveform parameter comprises at least one of: a slope, an offset, or a phase.

18. The radar detection apparatus of claim 16, wherein the antenna parameter comprises at least one of: a beam form, a polarization, or an antenna selection.

19. The radar detection apparatus of claim 16, wherein the modulation parameter comprises at least one of: a time division multiplexing (TDM) parameter, or a frequency division multiplexing (FDM) parameter.

20. The radar detection apparatus of claim 15, wherein one or more of the plurality of radar transmission parameters are varied substantially randomly.

21. The radar detection apparatus of claim 15, wherein one or more of the plurality of radar transmission parameters are varied based in part on a codebook.

22. The radar detection apparatus of claim 15, wherein the processor is further configured to receive a sidelink communication comprising codebook radar parameters configured to vary one or more of the plurality of radar transmission parameters.

23. The radar detection apparatus of claim 15, wherein the processor is further configured to receive a network communication comprising codebook radar parameters configured to vary one or more of the plurality of radar transmission parameters.

24. The radar detection apparatus of claim 15, wherein one or more of the plurality of radar transmission parameters are varied based in part on a threshold of interference associated with the one or more of the plurality of radar transmission parameters.

25. The radar detection apparatus of claim 24, wherein the threshold of interference is based in part on a signal to interference ratio (SIR).

26. The radar detection apparatus of claim 24, wherein the inference is based at least in part on one or more radar waveforms from one or more radar sources.

27. The radar detection apparatus of claim 15, wherein the TTIs comprise at least one of: a chirp, a set of chirps, a frame, or a slot.

28. The radar detection apparatus of claim 15, wherein the processor is configured to vary the radar waveform across TTIs based on one or more of the plurality of radar transmission parameters based at least in part on one or more vehicle-to-everything (V2X) communications.

29. A non-transitory computer readable storage medium that stores instructions that when executed by a processor of an apparatus cause the apparatus to perform a method of radar detection comprising:
   transmitting a radar waveform in transmission time intervals (TTIs) to perform detection of a target object;
   selecting a subset of a plurality of radar transmission parameters based on a current condition of the apparatus by:
      selecting, as the subset, a first subset of the plurality of radar transmission parameters based on at least one of: a first threshold of interference or a first driving mode of the apparatus; and
      selecting, as the subset, a second subset of the plurality of radar transmission parameters based on at least one of: a second threshold of interference or a second driving mode of the apparatus, wherein the first subset is different than the second subset; and
   varying the radar waveform across TTIs based on the selected subset of the plurality of radar transmission parameters, wherein the varying the radar waveform comprises varying values of at least one of the selected first subset of the plurality of radar transmission parameters or the selected second subset of the plurality of radar transmission parameters.

30. A means for radar detection by an apparatus, comprising:
   a means for transmitting a radar waveform in transmission time intervals (TTIs) to perform detection of a target object;
   a means for selecting a subset of a plurality of radar transmission parameters based on a current condition of the apparatus by:
      selecting, as the subset, a first subset of the plurality of radar transmission parameters based on at least one of: a first threshold of interference or a first driving mode of the apparatus; and
      selecting, as the subset, a second subset of the plurality of radar transmission parameters based on at least one of: a second threshold of interference or a second driving mode of the apparatus, wherein the first subset is different than the second subset; and
   a means for varying the radar waveform across TTIs based on the selected subset of the plurality of radar transmission parameters, wherein the varying the radar waveform comprises varying values of at least one of the selected first subset of the plurality of radar transmission parameters or the selected second subset of the plurality of radar transmission parameters.

* * * * *